US009154937B2

(12) United States Patent
Terry et al.

(10) Patent No.: US 9,154,937 B2
(45) Date of Patent: *Oct. 6, 2015

(54) SYSTEM FOR PERMITTING CONTROL OF THE PURGING OF A NODE B BY THE SERVING RADIO NETWORK CONTROLLER

(71) Applicant: InterDigital Technology Corporation, Wilmington (DE)

(72) Inventors: Stephen E. Terry, Northport, NY (US); Yi-Ju Chao, Minnetonka, MN (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,443

(22) Filed: Sep. 19, 2014

(65) Prior Publication Data
US 2015/0009938 A1    Jan. 8, 2015

Related U.S. Application Data

(63) Continuation of application No. 13/947,846, filed on Jul. 22, 2013, now Pat. No. 8,867,452, which is a continuation of application No. 13/481,137, filed on May 25, 2012, now Pat. No. 8,493,865, which is a (Continued)

(51) Int. Cl.
*H04W 4/00* (2009.01)
*H04L 12/28* (2006.01)
(Continued)

(52) U.S. Cl.
CPC ............. *H04W 8/02* (2013.01); *H04L 12/2856* (2013.01); *H04L 12/4633* (2013.01);
(Continued)

(58) Field of Classification Search
USPC .................................. 370/328, 412, 252, 235
See application file for complete search history.

(56) References Cited

U.S. PATENT DOCUMENTS 5,828,659 A    10/1998    Teder et al.
5,970,059 A    10/1999    Ahopelto et al.
(Continued)

FOREIGN PATENT DOCUMENTS

CN    1259704    7/2000
CN    1381961    11/2002
(Continued)

OTHER PUBLICATIONS

3GPP, 3$^{rd}$ Generation Partnership Project; Technical Specification Group Radio Access Network; UTRAN I$_{ub}$ Interface User Plane Protocols for Common Transport Channel Data Streams (Release 4), 3GPP TS 25.435, V4.4.0, (Mar. 2002).

(Continued)

*Primary Examiner* — Andrew Lee
(74) *Attorney, Agent, or Firm* — Volpe and Koenig, P.C.

(57) ABSTRACT

A system and method which permit the RNC to control purging of data buffered in the Node B. The RNC monitors for a triggering event, which initiates the purging process. The RNC then informs the Node B of the need to purge data by transmitting a purge command, which prompts the Node B to delete at least a portion of buffered data. The purge command can include instructions for the Node B to purge all data for a particular UE, data in one or several user priority transmission queues or in one or more logical channels in the Node B, depending upon the particular data purge triggering event realized in the RNC.

7 Claims, 4 Drawing Sheets

Related U.S. Application Data continuation of application No. 12/240,492, filed on Sep. 29, 2008, now Pat. No. 8,199,650, which is a continuation of application No. 10/431,895, filed on May 8, 2003, now Pat. No. 7,430,185.

(60) Provisional application No. 60/379,828, filed on May 10, 2002.

(51) Int. Cl.
| | |
|---|---|
| *H04W 8/02* | (2009.01) |
| *H04L 12/46* | (2006.01) |
| *H04L 12/801* | (2013.01) |
| *H04L 12/835* | (2013.01) |
| *H04L 12/823* | (2013.01) |
| *H04W 36/02* | (2009.01) |
| *H04W 28/12* | (2009.01) |
| *H04L 12/26* | (2006.01) |
| *H04L 12/861* | (2013.01) |
| *H04W 72/04* | (2009.01) |
| *H04W 28/14* | (2009.01) |
| *H04W 88/08* | (2009.01) |
| *H04W 88/12* | (2009.01) |

(52) U.S. Cl.
CPC ............ *H04L 43/065* (2013.01); *H04L 47/10* (2013.01); *H04L 47/14* (2013.01); *H04L 47/30* (2013.01); *H04L 47/32* (2013.01); *H04L 47/34* (2013.01); *H04L 49/90* (2013.01); *H04W 28/12* (2013.01); *H04W 36/02* (2013.01); *H04W 72/042* (2013.01); *H04W 28/14* (2013.01); *H04W 88/08* (2013.01); *H04W 88/12* (2013.01)

(56) References Cited

U.S. PATENT DOCUMENTS

| | | | |
|---|---|---|---|
| 6,058,106 | A | 5/2000 | Cudak et al. |
| 6,320,873 | B1 | 11/2001 | Nevo et al. |
| 6,385,174 | B1 | 5/2002 | Li |
| 6,879,830 | B1 | 4/2005 | Vollmer et al. |
| 7,190,680 | B2 | 3/2007 | Lim |
| 7,343,161 | B2 | 3/2008 | Shin |
| 8,149,716 | B2 | 4/2012 | Ramanathan et al. |
| 8,175,030 | B2 | 5/2012 | Terry et al. |
| 2001/0012279 | A1 | 8/2001 | Haumont et al. |
| 2002/0041566 | A1 | 4/2002 | Yang et al. |
| 2002/0172217 | A1 | 11/2002 | Kadaba et al. |
| 2003/0095519 | A1 | 5/2003 | Kuo et al. |
| 2003/0119556 | A1 | 6/2003 | Khan et al. |
| 2003/0152059 | A1 | 8/2003 | Odman |
| 2003/0210669 | A1* | 11/2003 | Vayanos et al. ............... 370/335 |
| 2004/0042436 | A1* | 3/2004 | Terry et al. .................... 370/341 |
| 2005/0047416 | A1* | 3/2005 | Heo et al. .................... 370/395.4 |
| 2005/0227732 | A1 | 10/2005 | Hiraki |
| 2007/0097926 | A1* | 5/2007 | Liu et al. ....................... 370/335 |
| 2007/0106924 | A1 | 5/2007 | Seidel et al. |
| 2007/0171830 | A1* | 7/2007 | Vulkan et al. ................. 370/235 |
| 2008/0186946 | A1* | 8/2008 | Marinier et al. .............. 370/349 |
| 2009/0086756 | A1* | 4/2009 | Tseng ........................... 370/469 |
| 2010/0246513 | A1* | 9/2010 | Lindskog et al. ............. 370/329 |
| 2012/0026942 | A1* | 2/2012 | Goto et al. .................... 370/328 |

FOREIGN PATENT DOCUMENTS

| | | |
|---|---|---|
| EP | 1081979 | 3/2001 |
| EP | 1083695 | 3/2001 |
| JP | 08-139736 | 5/1996 |
| KR | 2002-0024670 | 4/2002 |
| RU | 2249916 | 4/2005 |
| WO | 97/31499 | 8/1997 |
| WO | 00/05909 | 2/2000 |
| WO | 00/076243 | 12/2000 |
| WO | 01/58187 | 8/2001 |

OTHER PUBLICATIONS

3GPP, "3rd Generation Partnership Project; Technical Specification Group Radio Access Network; UTRAN $I_{ub}$ Interface User Plane Protocols for Common Transport channel Data Streams (Release 1999)," 3GPP TS 25.435 V3.10.0, (Mar. 2002).

3GPP, "3rd Generation Partnership Project; Technical Specification Group Radio Access Network; UTRAN $I_{ub}$ Interface User Plane Protocols for Common Transport Channel Data Streams (Release 4)," 3GPP TS 25.435 V4.5.0, (Sep. 2002).

3GPP, "3rd Generation Partnership Project; Technical Specification Group Radio Access Network; UTRAN $I_{ub}$ Interface User Plane Protocols for Common Transport Channel Data Streams (Release 5)," 3GPP TS 25.435 V5.0.0, (Mar. 2002).

3GPP, "3rd Generation Partnership Project; Technical Specification Group Radio Access Network; UTRAN $I_{ub}$ Interface User Plane Protocols for Common Transport Channel Data Streams (Release 5)," 3GPP TS 25.435 V5.4.0, (Mar. 2003).

3GPP, "3rd Generation Partnership Project; Technical Specification Group Radio Access Network; UTRAN Iub Interface: General Aspects and Principles (Release 1999)," 3GPP TS 25.430 V3.8.0 (Jun. 2002).

3GPP, "3rd Generation Partnership Project; Technical Specification Group Radio Access Network; UTRAN Iub interface: general aspeccts and principles (Release 4)," 3GPP TS 25.430 V4.2.0 (Dec. 2001).

3GPP, "3rd Generation Partnership Project; Technical Specification Group Radio Access Network; UTRAN Iub interface: general aspects and principles (Release 4)," 3GPP TS 25.430 V4.4.0 (Sep. 2002).

3GPP, "3rd Generation Partnership Project; Technical Specification Group Radio Access Network; UTRAN Iub interface: general aspects and principles (Release 5)," 3GPP TS 25.430 V5.0.0 (Mar. 2002).

3GPP, "3rd Generation Partnership Project; Technical Specification Group Radio Access Network; UTRAN Iub interface: general aspects and principles (Release 5)," 3GPP TS 25.430 V5.2.0 (Sep. 2002).

3GPP, "3rd Generation Partnership Project; Technical Specification Group Radio Access Network; UTRAN Iur interface user plane protocols for Common Transport Channel data streams (Release 1999)," 3GPP TS 25.425 V3.7.0 (Mar. 2002).

3GPP, "3rd Generation Partnership Project; Technical Specification Group Radio Access Network; UTRAN Iur interface user plane protocols for Common Transport Channel data streams (Release 4)," 3GPP TS 25.425 V4.3.0 (Mar. 2002).

3GPP, "3rd Generation Partnership Project; Technical Specification Group Radio Access Network; UTRAN Iur interface user plane protocols for Common Transport Channel data streams (Release 5)," 3GPP TS 25.425 V5.0.0 (Mar. 2002).

3GPP, "3rd Generation Partnership Project; Technical Specification Group Radio Access Network; UTRAN Iur interface user plane protocols for Common Transport Channel data streams (Release 5)," 3GPP TS 25.425 V5.4.0 (Mar. 2003).

Samsung, "High Speed Mobile Data Service," Korean Telecommunication Technology Association (Mar. 27, 2002).

Siemans, "Interactions between RLC Reset and Configured HS-DSCH," 3GPP TSG-RAN2 Meeting #33, R2-022803, (Nov. 12-15, 2002).

* cited by examiner

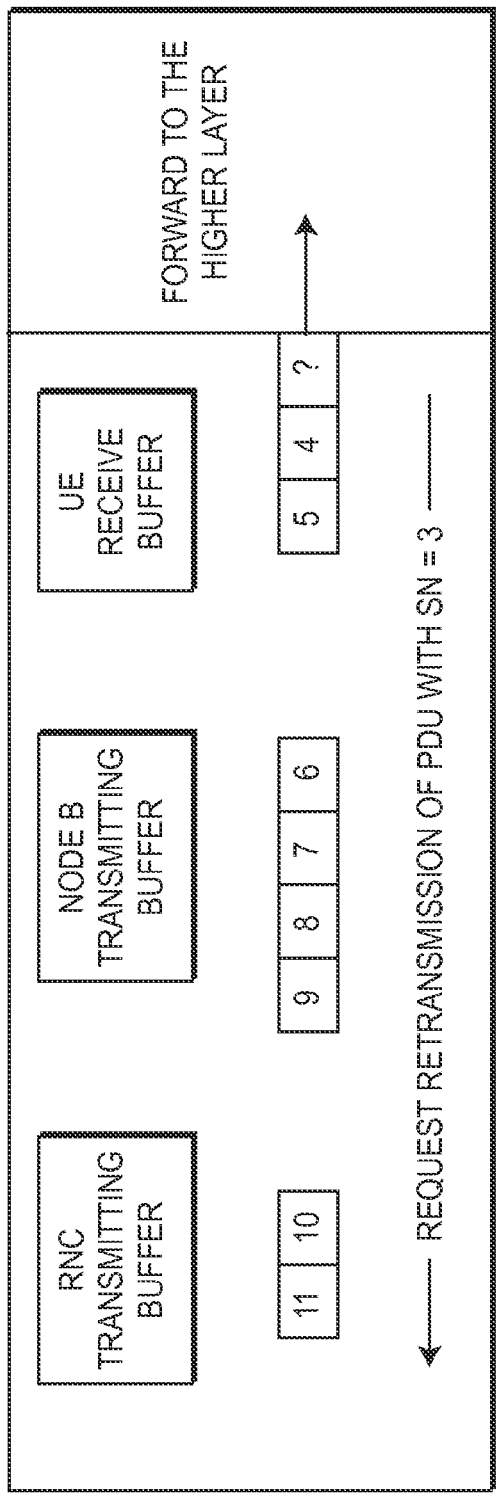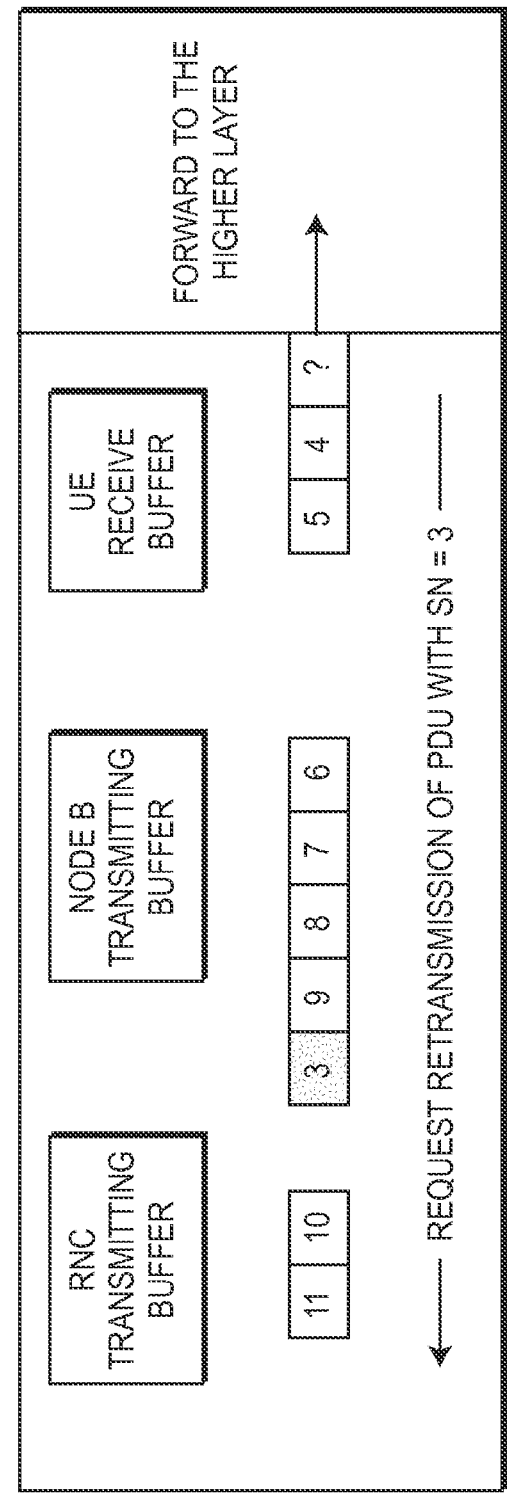

SYSTEM FOR PERMITTING CONTROL OF THE PURGING OF A NODE B BY THE SERVING RADIO NETWORK CONTROLLER

CROSS REFERENCE TO RELATED APPLICATIONS

This application is a continuation of U.S. patent application Ser. No. 13/947,846 filed Jul. 22, 2013, which is a continuation of U.S. patent application Ser. No. 13/481,137, filed May 25, 2012, which issued on Jul. 23, 2013 as U.S. Pat. No. 8,493,865, which is a continuation of U.S. patent application Ser. No. 12/240,492 filed Sep. 29, 2008, which issued on Jun. 12, 2012 as U.S. Pat. No. 8,199,650, which is a continuation of U.S. patent application Ser. No. 10/431,895, filed on May 8, 2003, which issued on Sep. 30, 2008 as U.S. Pat. No. 7,430,185, which claims priority from U.S. Provisional Patent Application No. 60/379,828 filed May 10, 2002, which are incorporated by reference as if fully set forth.

FIELD OF INVENTION

The present invention relates to the field of wireless communications. More specifically, the present invention relates to a system and method for permitting the control of the purging of a Node B by the serving radio network controller.

BACKGROUND

A third generation (3G) Universal Terrestrial Radio Access Network (UTRAN) comprises several radio network controllers (RNCs), each of which is coupled to one or more Node Bs. Each Node B comprises one or more base stations servicing one or more cells. The Node Bs, in turn, communicate with one or more User Equipment (UEs).

A 3G system, which includes both Frequency Division Duplex (FDD) and Time Division Duplex (TDD) modes, typically uses the RNC to distribute, (i.e., buffer and schedule), data transmissions to the UE. However, for the high speed channels of 3G cellular systems, data is distributed by the Node B. One of these high speed channels, for example, is the High Speed Downlink Shared Channel (HS-DSCH). Since data is distributed by the Node B, it is necessary to buffer data in the Node B prior to transmission to the UE.

There are many scenarios where the data that is buffered in the Node B is no longer useful, and its presence there could impede efficient operation of the system. For example, a first scenario is when a mobile UE travels from one cell to another. This will result in either an HS-DSCH cell change, whereby the UE is either serviced by another Node B, or switching between cells in the same Node B. The "old data", (i.e., the data that is buffered within the Node B for transmission to the UE prior to the HS-DSCH cell change), is no longer useful after the HS-DSCH cell change. If the Node B continues to buffer and transmit this data, it wastes both buffering resources and radio link resources. It is desirable to delete this old data from the buffer and to cease the transmission of this data since it will save both buffering resources and radio link resources.

A second scenario relates to the radio link control (RLC) layer. The RLC layer is a peer entity in both the serving radio network controller (SRNC) and the UE. There are occasions when the RLC peer to peer protocol fails, and the RLC resets itself. The reasons for RLC failure are varied and such reasons are outside the scope of the present invention. However, once the RLC resets itself, the data previously buffered in the Node B is no longer useful since the RLC resynchronizes and restarts transmissions. This buffered data can only cause transmission delays and unnecessary use of radio resources. If transmitted, this data will just be discarded by the RLC peer entity.

A third scenario relates to the in-sequence delivery of data by the RLC in Acknowledged Mode (AM). A requirement for the AM RLC is to make sure that in-sequence delivery of protocol data units (PDUs) occurs. The RLC uses a Sequence Number (SN) associated with each PDU to ensure in-sequence delivery of PDUs to higher layers. When there is an out-of-sequence delivery, (i.e., when a PDU is missed), the RLC in the UE sends a Status Report PDU to its peer entity in the Node B, requesting retransmission of the missed PDUs. Upon receiving the Status Report PDU, the peer entity in the RNC retransmits a duplicate of the missed PDU.

It is highly desirable for the retransmitted PDUs to arrive at the RLC of the receiving side (i.e., the UE) as soon as possible for several reasons. First, the missed PDU will prevent subsequent PDUs from being forwarded to higher layers, due to the requirement of in-sequence delivery. Second, the buffer of the UE needs to be sized large enough to accommodate the latency of retransmissions while still maintaining effective data rates. The longer the latency is, the larger the UE buffer size has to be to allow for the UE to buffer both the PDUs that are held up and continuous data receptions until the correct sequence PDU may be forwarded to higher layers. The larger buffer size results in increased hardware costs for UEs. This is very undesirable.

FIG. 1 is a prior art system including an RNC, a Node B, a UE and their associated buffers. In this prior art system, a PDU with SN=3 is not received successfully by the UE. Therefore, the RLC in the UE requests its peer RLC layer in the RNC for a retransmission. Meanwhile, the PDUs with SNs=6-9 are buffered in the Node B, and PDUs with SNs=4 and 5 are buffered in the UE. It should be noted that although FIG. 1 shows only several PDUs being buffered, in reality many more PDUs (such as 100 or more) and PDUs from other RLC entities may be buffered.

As shown in FIG. 2, the retransmission of the PDU with SN=3 must wait at the end of the queue in the Node B buffer, and will be transmitted only after the PDUs with SNs=6-9 are transmitted. The PDUs in the UE cannot be forwarded to the upper layers until all PDUs are received in sequence. In this case, the PDU with SN=3 stalls the forwarding of subsequent PDUs to higher layers, (i.e. SNs=4-9), assuming all the PDUs are transmitted successfully. Note that this example only reflects 10 PDUs, whereas in normal operation hundreds of PDUs maybe scheduled in advance of retransmitted data PDUs, which further aggravates transmission latency and data buffering issues.

The above scenarios are just a few of the many examples wherein the purging of data in the Node B would result in much more efficient operation of a wireless communication system.

It would be desirable to have a system and method whereby the RNC can control the purging of data buffered in the Node B that is no longer useful. Under many circumstances, deletion of this buffered data would result in more efficient operation of the system.

SUMMARY

The present invention comprises a system and method which permit the RNC to control purging of data buffered in the Node B. The purge command deletes Node B buffered data associated with a particular UE. The RNC determines either to purge all data for a particular UE, data in one or several user priority transmission queues, or in one or more logical channels in the Node B based on the particular data purge triggering event realized in the RNC. The RNC then informs the Node B of the need to purge transmission data. The purge command may comprise a configuration for the Node B to purge data upon receiving an existing (prior art) procedure initiated from the RNC, may comprise a completely new procedure that specifically requests a data purge by the Node B or may reside within an existing procedure or transmission data frame as a bit or an information element indicating the Node B purge requirement.

BRIEF DESCRIPTION OF THE DRAWINGS

FIG. 1 is a prior art retransmission of the RLC.

FIG. 2 is a prior art RLC retransmission without purge.

DETAILED DESCRIPTION OF THE PREFERRED EMBODIMENTS

Figure 3A:
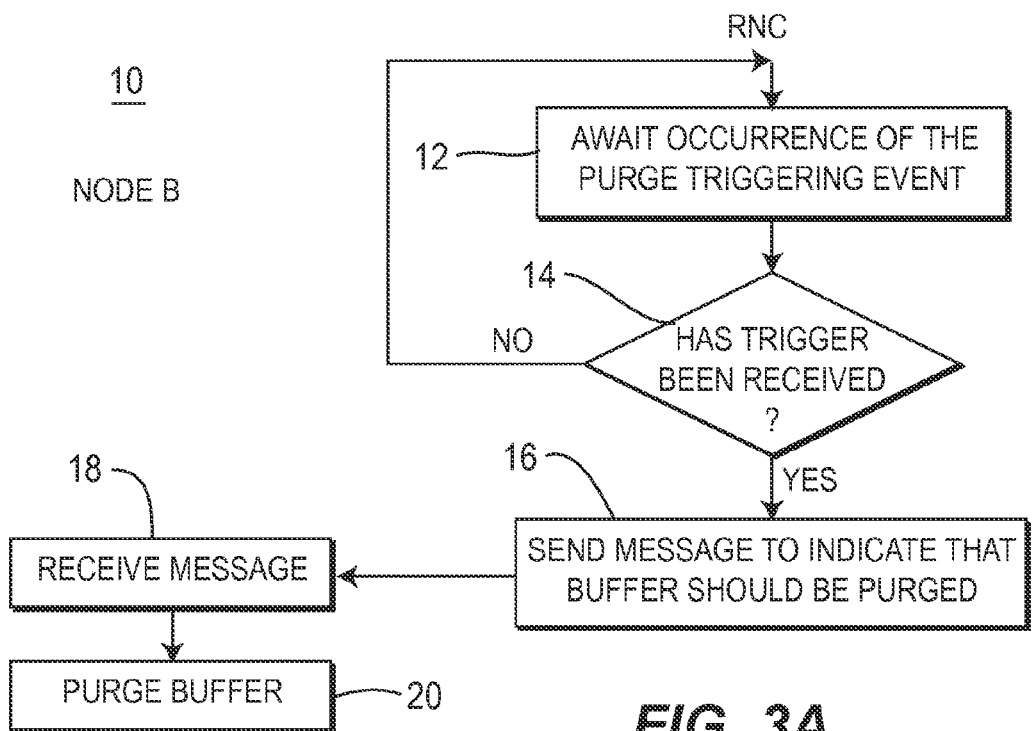
FIG. 3A is a method of generating a purge message in accordance with the present invention.

The preferred embodiments of the present invention will be described with reference to the drawing figures wherein like numerals represent like elements throughout.

Referring to FIG. 3A, a method 10 for the RNC to control the purging function within the Node B in accordance with the present invention is shown. The RNC awaits occurrence of the purge "triggering" event (step 12) associated with a particular UE. This triggering event may, for example, comprise a serving HS-DSCH cell change, an RLC reset or the generation of an RLC status report from the UE requiring retransmission of certain PDUs. Although these are three examples of triggering events, those of skill in the art should clearly recognize that any function could be used as a triggering event to purge the Node B if the purging of the Node B would result in a benefit to system operation. Accordingly, the method and system of the present invention as described hereinafter should not be limited solely to the three enumerated triggering events.

Depending on the purge triggering event, either all data associated with a UE, the data associated with a particular data flow of the UE or the data associated with one or more logical channels of the UE may be requested for deletion in Node B.

For example, in the case of a serving HS-DSCH cell change, all data for the UE buffered within the source Node B is no longer useful after the serving HS-DSCH cell change. The RNC may purge the source Node B to free the data in all the buffers associated with the UE such that no radio resource will be wasted on unnecessary data transmissions.

In the case of an RLC reset or RLC retransmission, the RNC may selectively purge data buffered in Node B for that particular UE by transmission priority queue or alternatively by logical channel associated with the RLC instance. The purging function will reduce RLC retransmission latency in the case of RLC retransmissions and will avoid wasting of radio resources in the case of RLC resets.

Referring again to FIG. 3A, the RNC determines whether a triggering event has been received (step 14). If not, the RNC returns to step 12 and continues to await the occurrence of a triggering event. If a triggering event has been detected, the RNC transmits a purge message to the Node B that indicates that the Node B should purge the desired data associated with that UE (step 16). This may be data in one or more buffers that is associated with the one or more data flows. After the Node B receives the message (step 18) it purges the desired buffer (step 20).

In accordance with the method 10 of the present invention, it should be recognized that the purging of the data within the Node B deletes data that is no longer useful and frees up both data buffering resources in Node B and radio resources that would unnecessarily be allocated for transmission of this data.

It should also be understood by those of skill in the art that the purge message as evidenced by step 16 may comprise any one or more of the following alternatives. In a first alternative of the purge message, the purge message in resides within an existing UTRAN procedure signaled between the RNC and the Node B, whereby the Node B is configured such that the reception of the message by the Node B initiates a purge. In this alternative, the data purge is implicit in an existing procedure and mere reception of the message, without any additional signaling, results in a data purge even if the message were related to a completely different function. The implicit association may occur with Frame Protocol data frames, may be carried in RLC PDUs, or may be carried as an information element of a prior art message or procedure of Node B Application Part (NBAP) or of Radio Network Subsystem Application Part (RNSAP).

In a second alternative of the purge message, the purge message may comprise a completely new or unique UTRAN procedure signaled between the RNC and the Node B that specifically directs the Node B to initiate a purging of the desired buffer. This comprises a separate message which is completely dedicated to the purging function. In this alternative, for example, a new control frame in the Frame Protocol is dedicated to the purging function or a new procedure NBAP or of RNSAP is dedicated to the purging function.

In a third alternative of the purge message, the purge message may comprise part of an existing UTRAN procedure. In this embodiment, a bit or an information element in part of a message in an existing UTRAN procedure signaled between the RNC and the Node B are dedicated to the purging function. The Node B receives this information via the existing procedure and reads the bit or information element to determine whether or not a purging should occur.

Finally, in a fourth alternative of the purge message, the Node B is preconfigured to purge data upon receiving from the RNC a message which can be either a prior art message or a new message. In this alternative, for example, the Node B can be preconfigured to purge data upon receiving a message indicating release of the HS-DSCH channel, (i.e., release of the radio link). The purging function will be beneficial since data associated with the HS-DSCH channel and buffered in the Node B is no longer useful after release of the HS-DSCH channel.

It should be understood by those of skill in the art that depending on the particular scenario, other functions may follow performance of the purging function in the Node B for the sake of proper system operation. This invention does not prevent coordination of the RNC controlled purging function in the Node B with other functions for different scenarios.

Figure 3B:
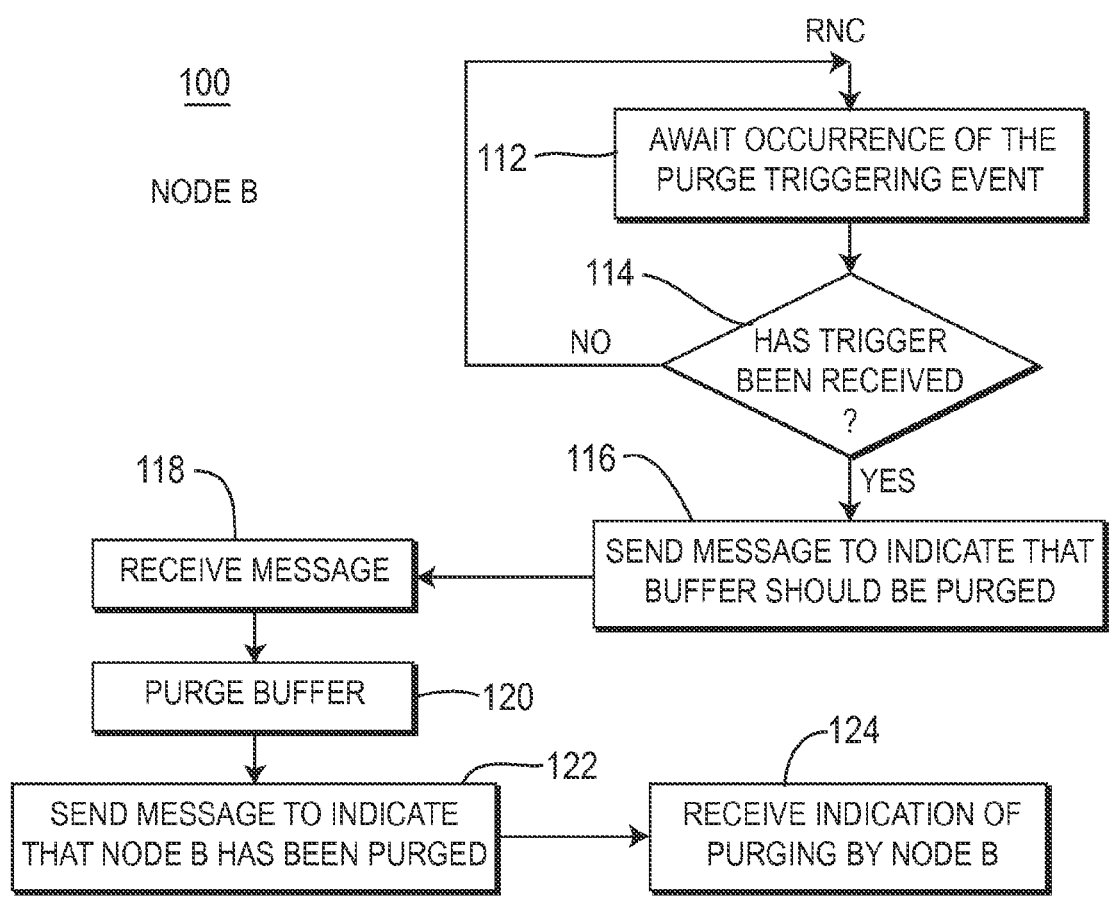
FIG. 3B is an alternative method of generating a purge message in accordance with the present invention including an acknowledgement.

The Node B may additionally acknowledge the purging function as shown in FIG. 3B. Steps 112-120 are the same as steps 12-20 shown and described with reference to the method 10 of FIG. 3A. Accordingly, those steps will not be further described. However, in accordance with this alternative of the method 100 of the present invention, after the Node B purges the desired buffer (step 120), it sends an acknowledgement to the RNC that the data has been purged (step 122). The RNC then receives and processes the acknowledgement (step 124).

The form of the acknowledgement and the actions that the RNC takes in response thereto may differ based on different system configurations suited for different scenarios. As an example, in HSDPA when the purging function is designed for RLC PDU retransmission, an acknowledgement from the Node B to the RNC after completing the purging function may be implemented for the RNC to resume PDU transmissions. In this case, the acknowledgement may be carried in similar methods as mentioned previously.

In a first alternative of the acknowledgement message, the acknowledgement message resides within an existing message from the Node B to the RNC such as in the header of Frame Protocol data frames, or as one or several bits, or an information element in a prior-art message of NBAP or of RNSAP.

In a second alternative of the acknowledgment message, the acknowledgement message may comprise a completely new or unique message. This comprises a separate message which is completely dedicated to the acknowledgement of the purging function such as a new control frame in the Frame Protocol dedicated to the purging acknowledgement function, or a new message of NBAP or of RNSAP dedicated to the purging acknowledgement function.

Finally, in a third alternative of the acknowledgement message, an existing message from the Node B to the RNC is preconfigured to indicate the acknowledgement of the purging function, even if there is no field in the message that is specifically reserved for the acknowledgement. It should be understood by those of skill in the art that depending on the particular scenario, other methods that can achieve proper system operation may be used to acknowledge the purging function.

Regardless of the form of the acknowledgement, it should be noted the acknowledgement may comprise several functions. First, it can comprise acknowledgement by the Node B of completion of the purging function. Alternatively, it can provide the status of PDU transmissions in the Node B to assist the RNC operation. Since the Node B is not aware of the SN of the PDU, the Node B cannot directly send the SN of transmitted PDUs back to the RNC. The Node B may inform the RNC of the PDU transmission status in terms of, for example, a bitmap identifying the status of PDUs in the Node B. The status may indicate the PDUs, or number of PDUs, that have been purged and those that are awaiting transmission.

Figure 4:
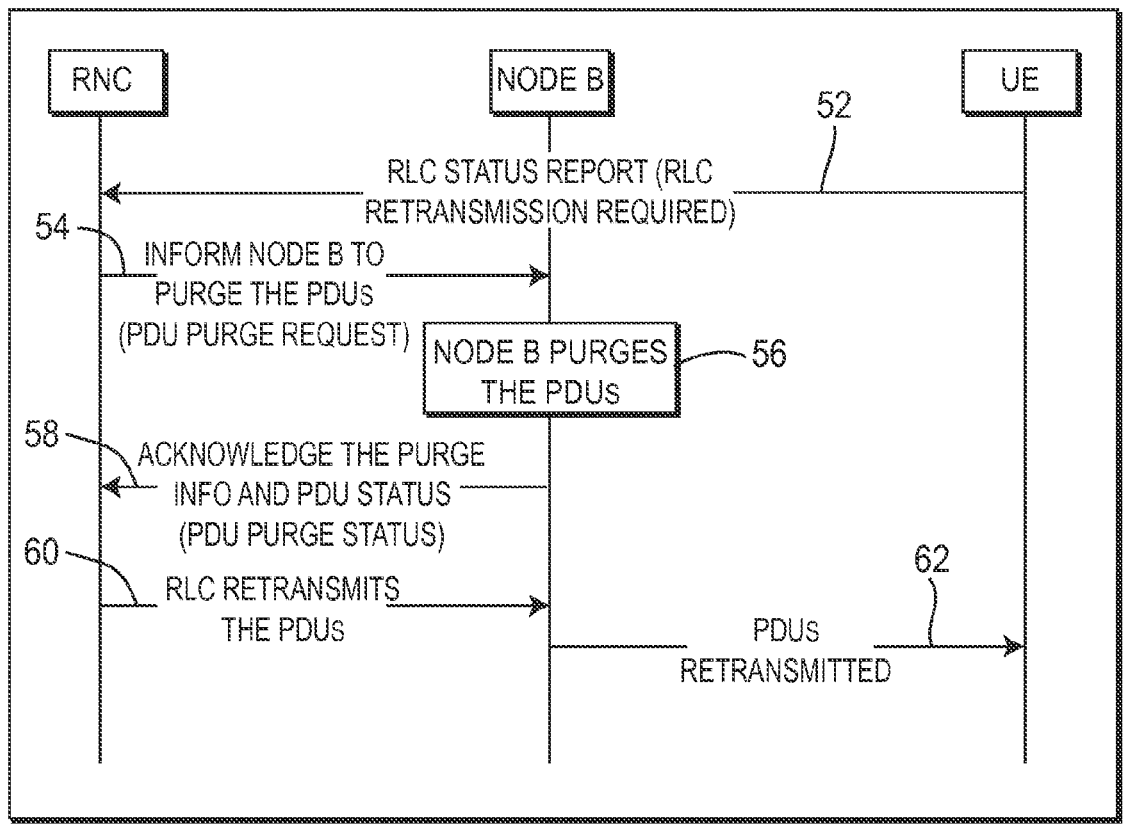
FIG. 4 is an example of the method in accordance with the present invention of the purge of the Node B with the RNC waiting to retransmit until the PDU purge status is received.

Referring to FIG. 4, one example of the method 50 of the present invention is shown. In this scenario, the UE transmits a status PDU indicating that one or more PDUs are missing. At step 52, the UE transmits to the RNC an RLC status report indicating the status of the PDUs. In this example, it is assumed that the status report indicates that one or more PDUs are missing. After processing the status report, the RNC sends a message to the Node B to purge the buffered PDUs from the buffers which are associated with the PDUs to be retransmitted (step 54).

The purge message may be carried via Frame Protocol either in a data frame with the retransmitted PDU or in a control frame sent at a higher priority than the retransmitted PDU. Alternatively, messages on the NBAP or the RNSAP can also be used to inform the Node B. The Node B purges the PDUs from the desired buffer (step 56) and acknowledges the purge and the PDU status to the RNC (step 58). The RNC then retransmits the missing and subsequent PDUs (step 60). The Node B forwards these PDUs to the UE (step 62). Alternatively, the purge message can be included along with the missed PDU in Frame Protocol or maybe transmitted in, or as a separate message on, the NBAP or the RNSAP.

Figure 5:
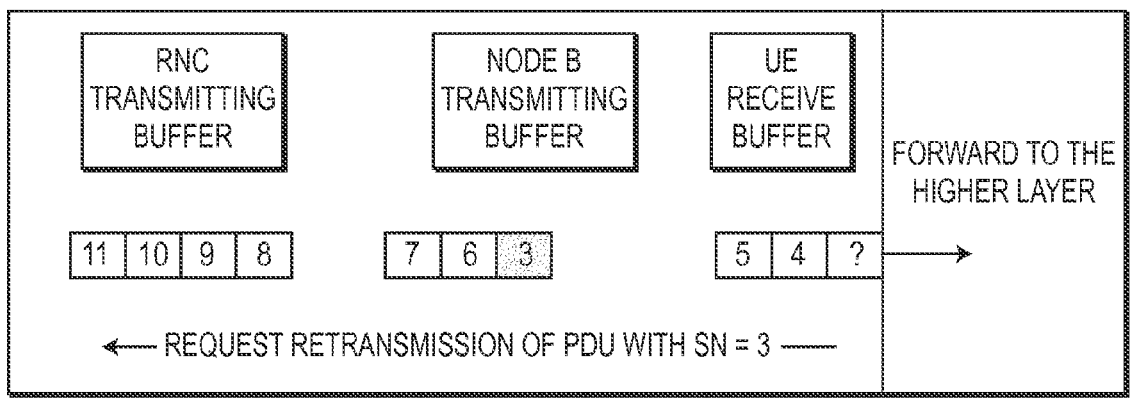
FIG. 5 is RLC retransmission in accordance with present invention with purge.

The benefit of implementing the Node B purging function in case of RLC retransmission is the reduction of the latency of transmissions, which will be explained in the following example. Referring to FIG. 5, with the purge function in accordance with the present invention, the Node B purges the buffer so PDUs with SNs=6-9 are deleted. Following completion of the purging function, the Node B acknowledges to the RNC the purging function and then the RNC resumes RLC transmission from SN=3 (i.e., the PDU which is missed in the UE). The Node B then receives the PDU with SN=3. Since there are no other PDUs ahead of it, the retransmitted PDU with SN=3 is transmitted much more quickly than the scenario shown in FIG. 2. In this example, the PDUs with SNs=6-9 are retransmitted again by the RLC of the transmitting side after the Node B has been purged.

The RNC may begin restarting the normal PDU sequence to the best of its ability immediately after sending the missed PDU, or it may wait until the PDU purge status is sent from the Node B acknowledging the purge and giving information on the purged PDUs.

In a first alternative, the acknowledgement of the purging function may not be performed, or even if the acknowledgement function is performed, the RNC will not wait after receiving the acknowledgement of the Node B purging function to begin retransmitting missed PDUs. The Node B will only purge PDUs buffered before receiving the purging function and will transmit to the UE recently received PDUs after receiving the purging command from the RNC.

In the second alternative, the RNC waits until a purging acknowledgement is sent from the Node B. If the acknowledgement also contains the status of data block transmissions in the Node B, the RNC may use the information to determine where to restart the PDU transmission.

Figure 6:
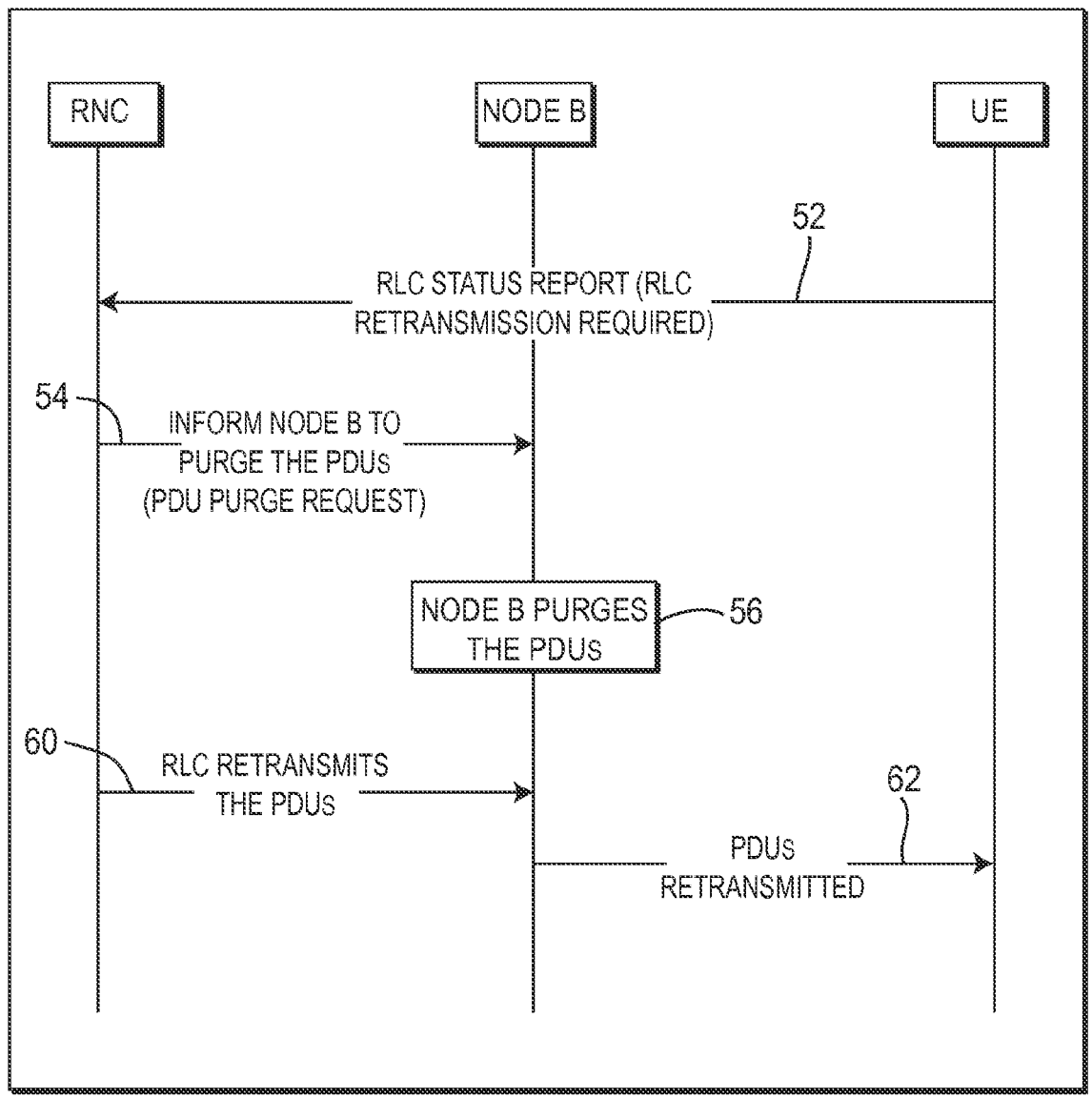
FIG. 6 is an example of the method in accordance with the present invention of the purge of the Node B with the RNC not waiting to retransmit until a PDU purge status is received.

Referring to FIG. 6, an alternative method 70 in accordance with the present invention is shown. This method 70 is similar to the method 50 shown in FIG. 4 except for the absence of the acknowledgement of the purging information and PDU status that the Node B sends to the RNC.

While the present invention has been described in terms of the preferred embodiment, other variations which are within the scope of the invention as outlined in the claims below will be apparent to those skilled in the art.

What is claimed is:

1. A radio network controller (RNC) comprising:
   at least one device configured to determine a radio link control (RLC) reset associated with a user equipment (UE); and
   the at least one device further configured, in response to the RLC reset determination, to send a data frame associated with a high-speed downlink shared channel (HS-DSCH) to a NodeB; wherein the data frame includes an information element that requests a purge of all packet data units (PDUs) associated with the UE in a transmission priority queue in the Node B.

2. The RNC of claim 1 wherein the information element is a single bit that requests the purge.

3. The RNC of claim 1 wherein the at least one component is further configured to receive an indication of the RLC reset from the UE.

4. A method for use by a radio network controller (RNC), the method comprising:
- receiving, by the RNC, an indication of a radio link control (RLC) reset associated with a user equipment (UE); and
- in response to receiving the RLC reset indication, to send a data frame associated with a high-speed downlink shared channel (HS-DSCH) to a NodeB; wherein the data frame includes an information element that requests a purge of all packet data units (PDUs) associated with the UE in a transmission priority queue in the Node B.

5. The RNC of claim 1 wherein the information element is a single bit that requests the purge.

6. A Node B comprising:
- a transmission priority queue configured for storing packet data units (PDUs) awaiting transmission to a user equipment (UE);
- at least one device configured to receive data from the user equipment indicating a radio link control (RLC) reset associated with the UE; and
- the at least one device is further configured to receive, in response to the RLC reset indication, a data frame associated with a high-speed downlink shared channel (HS-DSCH) from a radio network controller (RNC) and in response to the data frame including an information element that requests a purge, to purge all PDUs associated with the UE in the transmission priority queue.

7. The Node B of claim 6 wherein the information element is a single bit that requests the purge.

* * * * *

UNITED STATES PATENT AND TRADEMARK OFFICE
CERTIFICATE OF CORRECTION

PATENT NO. : 9,154,937 B2
APPLICATION NO. : 14/491443
DATED : October 6, 2015
INVENTOR(S) : Terry et al.

It is certified that error appears in the above-identified patent and that said Letters Patent is hereby corrected as shown below:

ON THE TITLE PAGE

On page 2, second column, item 56 section OTHER PUBLICATIONS, after line 20, insert --"3GPP, "3rd Generation Partnership Project; Technical Specification Group Radio Access Network; UTRAN Iub Interface: General Aspects and Principles (Release 1999), "3GPP TS 25.430 V3.7.0 (December 2001).--.

IN THE SPECIFICATION

At column 4, line 22, after the word "message", delete the word "in".

Signed and Sealed this
Nineteenth Day of July, 2016

Michelle K. Lee
*Director of the United States Patent and Trademark Office*